United States Patent [19]

Kirchmayer

[11] 4,444,177

[45] Apr. 24, 1984

[54] APPARATUS FOR CONVERTING SOLAR ENERGY INTO HEAT

[76] Inventor: Hermann Kirchmayer, Dorfstr. 18a, Antdorf, Fed. Rep. of Germany, D-8121

[21] Appl. No.: 330,490

[22] Filed: Dec. 14, 1981

[30] Foreign Application Priority Data

Dec. 22, 1980 [DE] Fed. Rep. of Germany ....... 3048499

[51] Int. Cl.³ .......................... F24J 3/02; F24D 11/00
[52] U.S. Cl. ..................................... 126/437; 165/18; 165/104.11
[58] Field of Search ............... 126/450, 444, 421, 449, 126/419, 437; 237/2 B; 62/235.1; 165/18, 104.11, 104.11 A

[56] References Cited

U.S. PATENT DOCUMENTS

| 2,713,252 | 7/1955 | Jackson | 165/18 |
| 3,961,619 | 6/1976 | Estes | 126/444 |
| 4,232,658 | 11/1980 | Gessford | 126/449 |
| 4,254,636 | 3/1981 | Zebuhr | 165/18 |
| 4,301,786 | 11/1981 | Kirchmayer | 126/450 |

FOREIGN PATENT DOCUMENTS 723322  3/1980  U.S.S.R. ............... 62/235.1

Primary Examiner—Samuel Scott
Assistant Examiner—G. Anderson
Attorney, Agent, or Firm—Holman & Stern

[57] ABSTRACT

The invention concerns an apparatus for converting solar energy into heat, comprising a solar collector made up of a plurality of collector elements which are attachable to the outside of a building or the like, are mutually couplable, and are capable of being connected to a heat transfer fluid circulation system, wherein each collector element includes a heat transfer fluid channel with a transparent cover.

22 Claims, 4 Drawing Figures

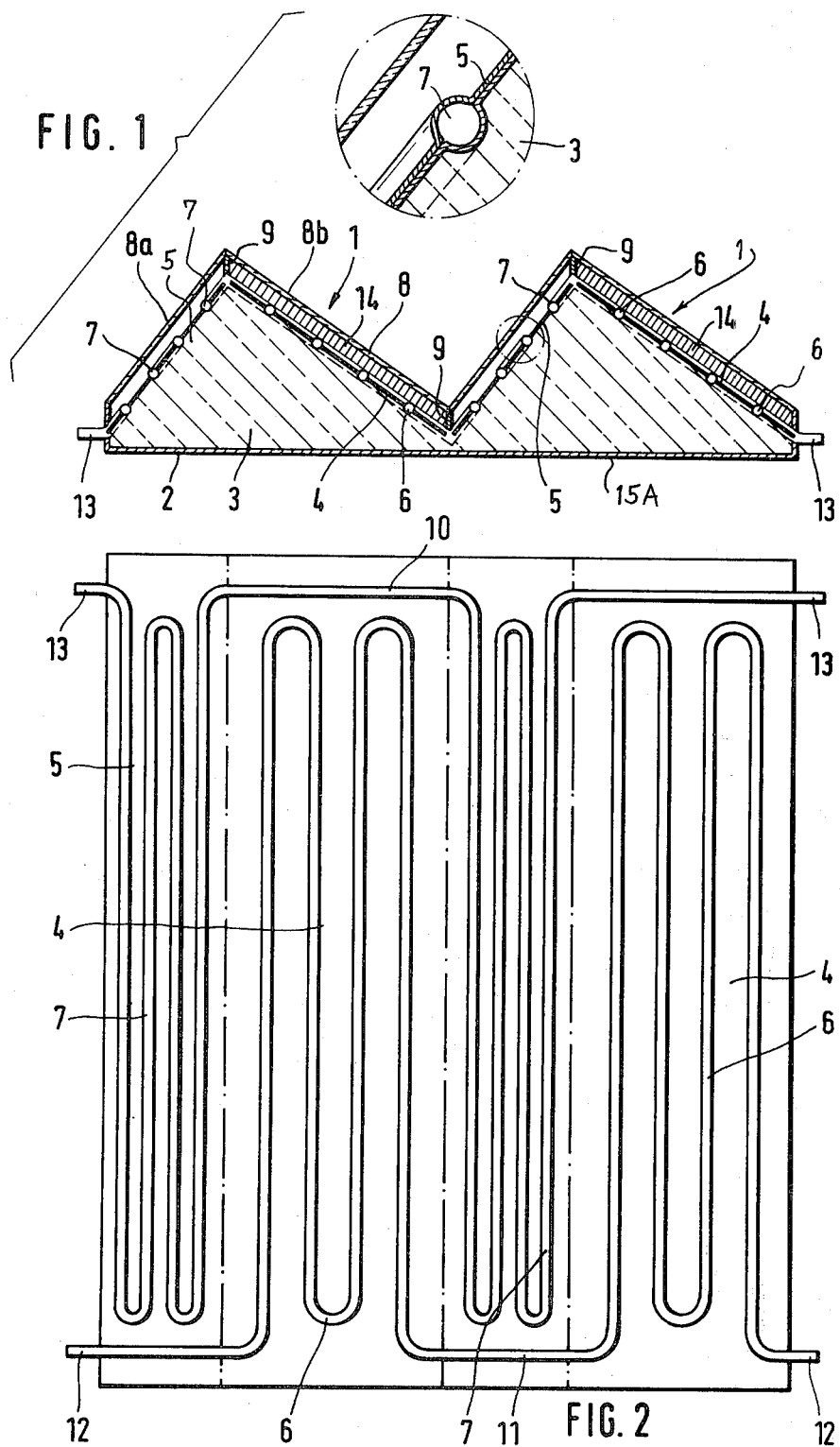

APPARATUS FOR CONVERTING SOLAR ENERGY INTO HEAT

BACKGROUND OF THE INVENTION

The invention concerns an apparatus for converting solar energy into heat, comprising a solar collector made up of a plurality of collector elements which are attachable to the outside of a building or the like, are mutually couplable, and are capable of being connected to a heat transfer fluid circulation system, wherein each collector element comprises a heat transfer fluid channel with a transparent cover.

A disadvantage found with known apparatuses of this type is that while there is no problem in extracting energy during the time of year when the temperature of the heat transfer fluid is above a certain value, when the temperature of the fluid falls below a certain minimum value the apparatus must be shut off. The underlying problem is to refine prior art apparatuses in such a way that energy can be extracted even under poor weather conditions or at relatively low ambient temperatures.

SUMMARY OF THE INVENTION

The apparatus according to the invention is an improvement over the prior art in that the heat transfer fluid channel, starting from the normal operating state wherein it is connected to an extracting (removing) energy (herein "high temperature") accumulator can be shut off from said high temperature accumulator by a changeover valve and can be connected to an adding energy (herein "low temperature") accumulator for heat pump operation, whenever the temperature of the circulating heat transfer fluid, as determined by a temperature sensor associated with the heat transfer fluid channel, falls below a certain predetermined minimum value.

In this advantageous manner, it is ensured that the high temperature accumulator will only receive heat transfer fluid which has a temperature equal to or greater than a certain value. If the temperature of the circulating heat transfer fluid is lower than the predetermined minimum temperature, there is still a measurable amount of extractable heat however small the amount may be. The heat pump mode of operation provides a particularly elegant means of then increasing the temperature of the heat transfer fluid by circulation to the "low temperature" accumulator.

It is particularly advantageous if, in a further embodiment of the invention, the low temperature accumulator is in communication with the high temperature accumulator via a heat pump system. The energy of the heat transfer fluid is thus raised in the low temperature accumulator and finally passed to the high temperature accumulator.

In a particular embodiment of the invention, collector elements are employed which have two inclined faces intersecting at approximately a right angle with each other, and both intersecting at acute angles with the base.

Preferably, one of the two collector element faces forms a steep angle on the order of 60° with the base, and the other forms a shallow angle on the order of 30° with the base, and each of said inclined faces is associated with a separate heat transfer fluid channel disposed in a plane with the same inclination as its associated inclined face. The first channel has its associated inclined face turned toward the sun and is the channel which is connected to the high temperature accumulator in the normal operating state, while the second channel, with its associated inclined face directed transversely to the arriving solar radiation, is in contact with the surrounding air via the intermediary of a heat-conducting medium and is connected to the low temperature accumulator for heat pump operation via a second conduit and associated pump.

Thus, by providing collector elements having angularly disposed heat transfer fluid channels, more energy is collected than by heat transfer fluid channels merely subjected to the incoming solar radiation and used for removing heat. By the invention, provision is made to collect heat energy supplied by convection (particularly when there are strong winds) in the second heat transfer fluid channel. Since the first heat transfer fluid channel is directed toward the sun (southern exposure), the second heat transfer fluid channel will extend in an east-west direction, the direction of the prevailing winds at our latitude, thus favoring optimal heat exchange. Due to the opportunity for advantageous use of both heat transfer fluid channels thus afforded, and due to the fact that the differing inclinations of the collector element faces permit collectors according to the invention to be attached to vertical, horizontal, or inclined building surfaces with the aim of achieving optimum operating conditions, the preconditions are present which make mass production feasible.

In order to better utilize available surfaces, it has proven beneficial to provide a cover over the second heat transfer fluid channel with external fins, serrations, ridges, or similar conductors which promote heat exchange.

Further details, advantages, and features of the invention will be seen from the following description and from the drawings, to which express reference is hereby made as regards any details not described in the text.

BRIEF DESCRIPTION OF THE DRAWINGS

FIG. 1 is a cross-sectional view of a collector element of the apparatus;

FIG. 2 is a schematic plan view showing the paths of the different heat transfer fluid channels in one of the collector elements of the invention;

DETAILED DESCRIPTION OF THE DRAWINGS

Figure 3:
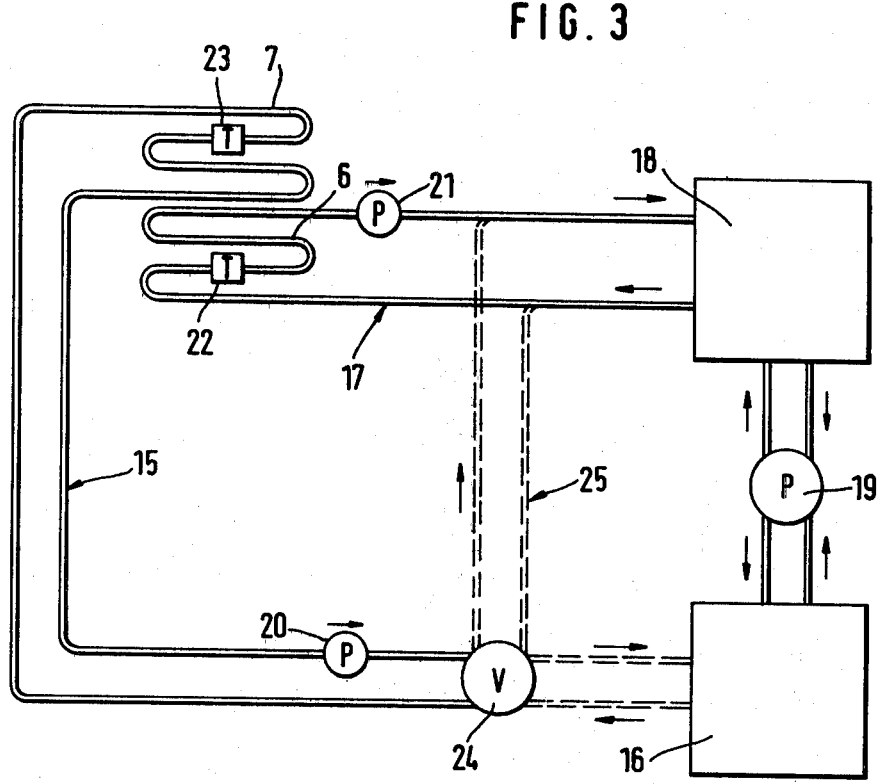
FIG. 3 is a schematic diagram showing the general flow configurations and interrelations of the collector element heat transfer channels.

As best seen in FIG. 1, each of the collector elements 1 of the invention comprises a housing 2 having a base 15A; an effective insulating material mass 3 disposed within the housing 2 and supporting first and second angularly disposed strips or carrier means 4 and 5, respectively, for carrying first and second heat transfer fluid channels 6 and 7, respectively; and a cover 8 for the housing 2 comprising first and second collector element faces 8a and 8b, respectively, disposed in parallel spaced relationship to the strips 4 and 5. In the embodiment illustrated in FIG. 1, the collector element faces 8a and 8b intersect at approximately a 90° angle, with the face 8a intersecting the base 15A of the housing 2 at a relatively steep angle of approximately 60° and with the face 8b intersecting the base 15 at a relatively shallow angle, of at least about 30°. The corresponding parallel strips or carrier means 4 and 5 intersect the base 15A at corresponding angles.

The carrier means 4 and 5 suitably comprise strips of aluminum or similar metal or other material of high thermal conductivity, each defining at least one heat transfer fluid channel 6 and 7, respectively; preferably, a plurality of channels 6 and 7 are provided. The carrier means 4 and 5 may conveniently each be formed from a pair of superposed strips of aluminum, at least one of each superposed strips having a groove stamped therein to form fluid channels 6 and 7; the cross-sectional area of the channels 6 and 7 may be increased by stamping corresponding grooves in each of the superposed strips. The cover 8, including the collector element faces 8a and 8b is transparent, preferably of a weather-resistant material such as Plexiglass TM. Further, if the insulating material mass 3 is sufficiently sturdy, for example, of a relatively dense polyurethane foam, the housing 2 may be unnecessary to the collector 1. Preferably, the collector 1 includes panels 9 disposed between the carrier means 4 and 5 and collector faces 8a and 8b, respectively, to prevent air circulation from a warmer chamber to unirradiated colder chambers.

In the embodiment illustrated in FIG. 1, two pairs of adjoining strips 4 and 5 having channels 6 and 7 and associated collector element faces 8b and 8a are provided. By dividing the unit into two pairs in this way, the height of the longitudinal edges of sheets 8a and 8b can be kept relatively low, even if the width of the collector element unit is, for example, about 1.5 m. A greater degree of division will permit even greater height reduction, which may enhance the applicability of the collector element 1 from an esthetic standpoint.

It is seen in FIG. 2 that the channels 7 of the narrower strips 5 associated with the steeper faces 8a communicate with a connecting pipe 10 disposed posteriorly to collector element 1. Correspondingly, anterior to the collector element 1 there is a connecting pipe 11 which communicates with channels 6 of strips 4 associated with the shallowly inclined faces 8b. The channels 6 of strips 4 have feed and outlet pipes 12, and channels 7 of strips 5 have corresponding feed and outlet pipes 13. Adjacent collector elements 1 can be coupled together via the feed and outlet pipes 12 and 13. The feed and outlet pipes 12 and 13, instead of opening out on the side of the collector element, may open out on the end, either alternatively or additionally to the configuration of FIG. 2, in order to connect collector elements lying end to end in a line.

The described collector elements 1 can be attached to a horizontal surface such as a flat roof or to a vertical wall by attaching means not illustrated. In the case of mounting on a vertical wall, the more shallowly inclined surface 8b, and thus the strip 4 of each pair, is directed toward the sun. In the case of horizontal mounting, the more steeply inclined face 8a and thus the narrower strip 5 of each pair, is turned toward the sun (southward). With horizontal mounting, only the channels 7 are connected to the heat transfer fluid network leading to an energy accumulator; thus, under the circumstances, only they act as true solar collector channels. The strips 4 with channels 6, which are on the shadow side and are thus colder, are connected to a special heat transfer fluid loop, in a manner described infra. In order to provide good thermal-conductivity to the outside, the spaces between the strips 4 and faces 8b are filled with metal wool, metal paste, or another good heat-conducting medium 14, as illustrated in FIG. 1. If the collector elements 1 are to be mounted on an inclined surface rather than a horizontal surface, with a slope in the range of around 30°, for example a southward facing roof, they should be mounted in a position turned 180° from the horizontal surface mounting position; here the wider strips 4 with channels 6 will have the optimum irradiation attitude, and it will be the chambers over strips 5 with channels 7 which will need to be filled with the good heat-conducting medium 14. The situation of mounting on a vertical wall is analogous to this last situation.

As seen in FIG. 3, the second heat transfer fluid channel 7, which has the more steeply inclined corresponding face 8a turned toward the sun in the case of horizontal mounting communicates with an high temperature accumulator 16 via a connecting pipe 15. The first heat transfer fluid channel 6, which is disposed transversely to the arriving solar radiation, and which contacts the surrounding air via the intermediary of the heat-conducting medium 14, communicates with an low temperature accumulator 18 via a connecting pipe 17. This low temperature accumulator 18 communicates with the high temperature accumulator 16 via a heat pump 19. Connecting pipes 15 and 17 each contain a pump (20, 21) in their run. Each of the two heat transfer fluid channels 6 and 7 has an associated temperature sensor (22 and 23, respectively). Sensor 23 is connected via control means (not shown) to a changeover valve 24 in connecting pipe 15 and the pump 20 in the forward-flow section of connecting pipe 15. Sensor 22 which is associated with heat transfer fluid channel 6, is connected via control means (also not shown) to pump 21 in the forward-flow section of connecting pipe 17. Changeover valve 24 is associated with a transverse pipe 25 over which the heat transfer fluid can be passed from channel 7 to the low temperature accumulator 18 instead of to the high temperature accumulator 16.

The following modes of operation are permitted by the apparatus of the invention illustrated in FIG. 3. In the case of horizontal mounting, under normal operating conditions, i.e., with solar irradiation and relatively warm weather, channel 7 is connected to the high temperature accumulator via the connecting pipe 15 and the changeover valve 24, and heat transfer fluid is fed to the high temperature accumulator 16 via pump 20. Channel 6 is connected to the low temperature accumulator 18 via the connecting pipe 17, and heat transfer fluid from channel 6 is fed directly to the low temperature accumulator by pump 21.

If the weather conditions change and the temperature in the region of heat transfer fluid channel 7 falls below a predetermined limiting value, e.g. 45° C., then the control means associated with temperature sensor 23 cause the changeover valve 24 to shut off the connecting pipe 15 to the high temperature accumulator and to open transverse pipe 25 going to the low temperature accumulator 18. A situation may arise during relatively cold weather but with strong sunlight, wherein the heat transfer fluid channel 7 remains connected to the high temperature accumulator 16 (since the temperature of the fluid has not fallen below the 45° mark) while at the same time the temperature in heat transfer fluid channel 6 stays at a level below the economical limit, which may be, for example, 5° C. In this case, pump 21 will be simply turned off, so as not to supply the low temperature accumulator 18 with heat transfer fluid below the predetermined minimum temperature.

Only on extremely cold days without sunlight will the situation arise where both temperature sensors 22 and 23 bring about shutoffs of both pumps 20 and 21 as a result of the fact that in heat transfer fluid channel 7, the minimum temperature which is regarded as worthwhile for actuating changeover valve 24 to connect-in low temperature accumulator 18 via transverse pipe 25, is never reached.

Figure 4:
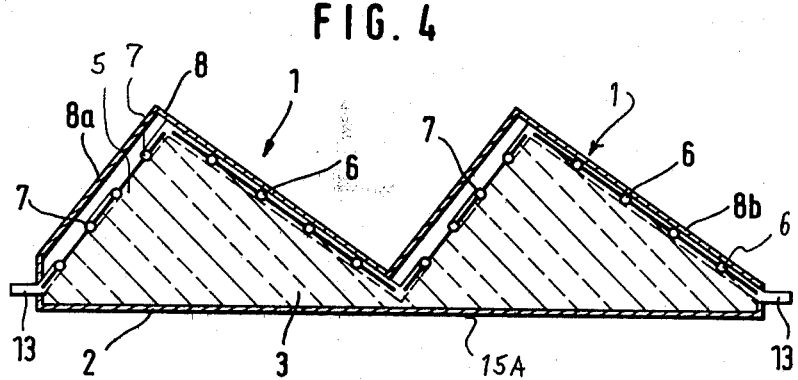
FIG. 4 is an alternative embodiment of the collector element of FIG. 1.

FIG. 4 shows a particularly advantageous embodiment of the collector element 1 of FIG. 1. In this version the cover 8 with slopes of its sections matching those of the successive heat transfer fluid channels is mounted in a configuration which is shifted with respect to the channels, such that the collector element faces 8b associated with the first heat transfer fluid channel 6 are practically in contact with the channel. At the same time, the collector element faces 8a associated with the second heat transfer fluid channel 7, form the boundary of a heat-insulating chamber. This configuration is intended for applications of the collector elements in which the channels 7 are turned toward the sun, and are connected to the high temperature accumulator 16 under normal operating conditions, while the channels 6 are connected to the low temperature accumulator 18. Alternatively, it is relatively simple to construct a version of the collector element 1 with the same type of cover 8 but which is intended to be used with the channels 6 turned toward the sun to act as the solar collector section. In this case, the cover 8 will be given a different sideways shift, being mounted in such a way that the collector element faces 8a are in contact with the channels 7, and the channels 6 and the corresponding collector element faces 8b form boundaries of heat-insulating chambers.

What is claimed is:

1. An energy conversion system for converting solar energy into heat comprising
    a solar collector including at least one first collector element transmissive of solar radiation having a first heat transfer fluid channel and at least one second collector element having a second heat transfer fluid channel, said first and second collector elements being mountable so that said first collector element receives more solar radiation than said second collector element;
    a high-temperature accumulator for receiving high-temperature heat transfer fluid from said first channel;
    a low-temperature accumulator for receiving low-temperature heat-transfer fluid from said first channel;
    first communication means for communicating said high-temperature accumulator with said first channel;
    second communication means for communicating said low temperature accumulator with said first channel;
    third communication means for communicating said low-temperature accumulator with said second channel;
    first pump means for circulating heat transfer fluid between said first channel and said accumulators;
    second pump means for circulating heat transfer fluid between said second channel and said low temperature accumulator;
    temperature responsive valve means for directing high-temperature fluid from said first channel to said high temperature accumulator and for directing low temperature fluid to said low-temperature accumulator; and
    heat pump means for extracting heat energy from the low temperature fluid in said low temperature accumulator.

2. The energy conversion system of claim 1, further including accumulator conduit means for placing the fluid within said accumulators in heat exchange relationship, and wherein said heat pump means is associated with said accumulator conduit means and further functions to deliver extracted heat energy to said high temperature accumulator.

3. The energy conversion system of claim 1, further including accumulator conduit means for placing the fluid within said accumulators in heat exchange relationship, and wherein said heat pump means is associated with said accumulator conduit means and further functions to deliver extracted heat energy to said high temperature accumulator.

4. The energy conversion system of claim 1, further including regulating means for regulating the operation of said first and second pump means and said valve means comprising heat sensors responsive to the temperature of the circulating heat transfer fluid.

5. The energy conversion system of claim 4, wherein a first sensor regulates the operation of said first pump means and a second sensor regulates the operation of said second pump means.

6. The energy conversion system of claim 5, wherein said first and second sensors each cause the respective pump means to cease operation at predetermined minimum temperatures.

7. The energy conversion system of claim 1, wherein at a predetermined minimum temperature, said valve means operates to divert fluid circulating between said first channel and said high temperature accumulator to said low temperature accumulator, and at a lower predetermined temperature said first pump means ceases operation.

8. The energy conversion system of claim 1, wherein at least two first and second collector elements are joined at about a 90° angle to form the faces of a third collector element.

9. The energy conversion system of claim 8, wherein the third collector element includes a base, and said first collector element intersects the base at about a 60° angle, and said second collector element intersects the base at about a 30° angle.

10. The energy conversion system of claim 9, wherein the solar collector includes a plurality of longitudinally disposed third collector elements.

11. The energy conversion system of claim 9, wherein the space between the base of the third collector element and the faces thereof includes a mass of insulating material.

12. The energy conversion system of claim 1, wherein the first and second collector elements and their associated heat transfer channels are mountable in intersecting planes with said first collector element disposed for full exposure to solar radiation and said second collector element is disposed for transverse exposure to solar radiation.

13. The energy conversion system of claim 12, wherein said second collector element further includes heat exchange means for transferring ambiant heat to the fluid in the associated second heat transfer fluid channel.

14. The energy conversion system of claim 13, wherein said second heat transfer fluid channel includes a transparent cover, and said heat exchange means comprises external fins, serrations, or ridges associated with said cover.

15. The energy conversion system of claim 9, wherein each of the heat transfer fluid channels comprises a first strip of material having a stamped groove and a second strip of material joined to the first to cover the groove.

16. The energy conversion system of claim 1, wherein each of the first collector elements includes a cover for its associated first heat transfer fluid channel parallel to and spaced from said first channel, forming a boundary of a heat-insulating chamber, and each of said second collector elements includes a cover for its associated second heat transfer fluid channel parallel to, and nearly in contact with, said second channel.

17. The energy conversion system of claim 1, wherein each of the first and second fluid transfer channels includes a cover spaced from its associated channel, and a heat-conducting material is disposed in the space between each of said second channels and its cover.

18. The energy conversion system of claim 17, wherein the heat-conducting medium is a metal wool or metallic paste.

19. The energy conversion system of claim 3, wherein the solar collector includes a plurality of communicating first collector elements in transverse alignment.

20. The energy conversion system of claim 1, wherein the solar collector includes a plurality of communicating first collector elements in transverse alignment, and a plurality of communicating second collector elements in transverse alignment.

21. The energy conversion system of claim 20, wherein the communicating elements communicate through metallic connector pipes.

22. The energy conversion system of claim 1, wherein said first communication means communicates with said second communication means, and said valve means is disposed at the communication point thereof.

* * * * *